US00RE34588E

United States Patent [19]

Hong

[11] E Patent Number: Re. 34,588

[45] Reissued Date of Patent: Apr. 19, 1994

[54] HYDROGEN STORAGE HYDRIDE ELECTRODE MATERIALS

[76] Inventor: Kuochih Hong, 4853 Gamber Dr., Troy, Mich. 48098

[21] Appl. No.: 882,233

[22] Filed: May 8, 1992

Related U.S. Patent Documents

Reissue of:

[64] Patent No.: 4,849,205
Issued: Jul. 18, 1989
Appl. No.: 122,042
Filed: Nov. 17, 1987

U.S. Applications:

[63] Continuation of Ser. No. 438,340, Nov. 16, 1989, abandoned.

[51] Int. Cl.[5] ..... C01B 6/00; H01M 4/00

[52] U.S. Cl. ..... 423/644; 420/900; 420/588; 420/580; 420/424; 420/417; 420/421; 429/207

[58] Field of Search ..... 420/900, 588, 580, 424, 420/417, 421; 423/644

[56] References Cited

U.S. PATENT DOCUMENTS

| | | | |
|---|---|---|---|
| 3,660,082 | 5/1972 | Negishi et al. | 75/134 |
| 3,669,745 | 6/1972 | Beccu et al. | 136/20 |
| 3,824,131 | 7/1974 | Beccu et al. | 136/20 |
| 4,075,312 | 2/1978 | Tanaka et al. | 423/648 |
| 4,111,689 | 9/1978 | Liu et al. | 75/122 |
| 4,112,199 | 9/1978 | Dunlop et al. | 429/29 |
| 4,160,014 | 7/1979 | Gamo et al. | 423/644 |
| 4,195,989 | 4/1980 | Gamo et al. | 75/175 |
| 4,370,163 | 1/1983 | Moriwaki et al. | 420/582 |
| 4,440,736 | 4/1984 | Maeland et al. | 423/644 |
| 4,457,891 | 7/1984 | Barnauer et al. | 420/434 |
| 4,487,817 | 12/1984 | Williams et al. | 429/27 |
| 4,551,400 | 11/1985 | Sapru et al. | 429/94 |
| 4,716,088 | 12/1987 | Reichman et al. | 429/101 |
| 4,728,586 | 3/1988 | Vankatesan et al. | 429/94 |
| 4,851,299 | 7/1989 | Godziemba-Maliszewski | 420/580 |
| 4,946,646 | 8/1990 | Gamo et al. | 420/580 |

FOREIGN PATENT DOCUMENTS

| | | |
|---|---|---|
| 197675 | 10/1986 | European Pat. Off. . |
| 197680 | 10/1986 | European Pat. Off. . |
| 198599 | 10/1986 | European Pat. Off. . |
| 3031471 | 9/1983 | Fed. Rep. of Germany . |
| 3023770 | 11/1983 | Fed. Rep. of Germany . |
| 3151712 | 6/1984 | Fed. Rep. of Germany . |
| 1565808 | 5/1969 | France . |
| 55-91950 | 7/1980 | Japan . |
| 57-148883 | 9/1982 | Japan . |
| 58-167741 | 10/1983 | Japan . |
| 60-241652 | 1/1985 | Japan . |
| 61-233969 | 10/1986 | Japan . |

OTHER PUBLICATIONS

T. Schober & H. Wenzl, "The Systems NbH(D), TaH(D), VH(D): Structures, Phase Diagrams, Morphologies Method of Preparation", *Hydrogen in Metals II*, (1978), pp. 11-23.

D. Rohy & R. M. Cotts, "Electronic Specific Heat of Vanadium Chromium Hydride", *Physical Review*, vol. 1, No. 6, pp. 2484-2487, (Mar. 15, 1970).

(List continued on next page.)

*Primary Examiner*—Michael Lewis
*Assistant Examiner*—Steven Bos
*Attorney, Agent, or Firm*—Brooks & Kushman

[57] ABSTRACT

Four groups of advanced hydrogen hydride storage and hydride electrode materials, consisting of two common elements, titanium and nickel. In the first group of materials, zirconium and chromium are added with the common elements. The second group of materials contain three additional elements in addition to the common elements, namely, chromium, zirconium and vanadium. The third group of materials contain also, in addition to the common elements, zirconium and vanadium. The fourth group of materials adds manganese and vanadium with the common elements. The preparation methods of the materials, as well as their hydride electrode are disclosed. Electrochemical studies indicate that these materials have high capacity, long cycle life and high rate capability.

29 Claims, No Drawings

OTHER PUBLICATIONS

Justi et al., "Electrocatalysis in the Nickel-Titanium System", *Energy Conversion*, vol. 10, pp. 183-187, (Mar. 1970).

Gujalar, Buchner & Beccu, "A New Type of Reversible Negative Electrode for Alkaline Storage Batteries Based on Metal Alloy Hydrides", *8th Int. Power Sources Conference*, (1973), pp. 79-91.

Labaton, Garner & Whitehead, "Phase & Equilibrium Pressure Studies of the Zr-Ti-H System", *J. Inorg. Nucl. Chem.*, vol. 24, pp. 1197-1204, (Apr. 1962).

Libowitz, "Effect of Thermal Gradients on Metal-Gas Systems", *Atomic International*, vol. 62, pp. 296-298, (Mar. 1958).

Korst, "The Crystal Structure of $NiZrH_3$", *Atomics International*, vol. 66, pp. 370-372, (Feb. 1962).

Shaltiel, Jacob & Davidov, "Hydrogen Absorption & Desorption Properties of $AB_2$ Laves Phase Pseudobinary Compound", *Journal of the Less-Common Metals*, vol. 53, pp. 117-131 (1977).

Jacob, et al., "Hydrogen absorption in $(Zr_xTi_{1-x})B_2$ (B=Cr, Mn) and the Phenomen. Model for the Absorption Capacity in Pseudo-Binary Laves-Phase Compounds", *Journal of the Less-Common Metals*, vol. 73, pp. 369-376 (1980).

Jacob, Shaltiel, et al., "A Phenomen. Model for the Hydrogen Absorption Capacity in Pseudobinary Laves Phase Compounds", *Solid State Communications*, vol. 23, pp. 669-672 (1977).

Reilly & Wiswall, "The Higher Hydrides of Vanadium & Niobium", *Inorganic Chemistry*, vol. 9, No. 7, pp. 1678-1682 (1970).

Wakao, et al., "Electrochemical Capacities & Corrosion of $TiNI_x$ and its Zirconium-Substituting Alloy Hydride Electrodes", *Journal of Less-Common Metals*, vol. 104, pp. 365-373 (1984).

Bronoel, Sarradin & Bonnemay et al., "A New Hydrogen Storage Electrode", *International Journal of Hydrogen Energy*, vol. 1, pp. 251-254 (1976).

Gamo, Yamashita et al., "Ti-Mn Alloy Systems for Hydrogen Storage Material", *National Technical Report*, vol. 25, No. 5 (1979).

Wiswall, "Hydrogen Storage in Metals", *Hydrogen in Metals II* (1978), pp. 201-242.

Van Essen & Buschow, "Hydrogen Absorption in Various Zr-Hf based Intermetallic Compounds", *Journal of Less Common Metals*, vol. 64, pp. 277-284 (1979).

Van Essen & Buschow, "Composition & Hydrogen Absorption C14 type Zr-Mn Compounds", *Mat. Res. Bull.*, vol. 15, pp. 1149-1155 (1980).

Pourarian, Sinha et al., "Kinetics & Thermodynamics of $ZrMn_2$-based Hydrides", *Journal of Less Common Metals*, vol. 88, pp. 451-458 (1982).

Oesterreicher & Bittner, "Studies of Hydride Formation in $Ti_{1-x}Zr_xMn_2$", *Mat. Res. Bull.*, vol. 13, pp. 83-88 (1978).

Sinha, Pourarian & Wallace, "Hydrogenation Characteristics of $Zr_{1-x}Ti_xMnFe$ Alloys", *Journal of the Less Common Metals*, vol. 87, pp. 283-296 (1982).

Pourarian & Wallace, "Anomalies in the Behavior of the Non-Stoichiometric Systems $ZrMn_2T_{0.8}$", *Solid State Communications*, vol. 45, pp. 223-225 (1983).

Sinha, "Hydrides of $ZrMn_2$-Based Alloys Substoichiometric in Zr for Engineering Applications", *Journal of the Less Common Metals*, vol. 106, pp. 199-210 (1985).

Sinha, Yu & Wallace, "Hydrogen Storage in Some Ternary & Quaternary Zr-Based Alloys with the C14 Structure", *Journal of Less Common Metals*, vol. 106, pp. 67-77 (1985).

Lynch, Reilly & Millot, "The Absorption of Hydrogen by Binary V-Cr Alloys", *J. Phys. Chem. Solids*, vol. 39, pp. 883-890 (1978).

Pourarian & Wallace, "Hydrogen Sorption Characteristics of $Zr_{1-x}Ti_x(Cr_{1-y}Fe_y)_2$ Alloys", *Journal of Less Common Metals*, vol. 107, pp. 69-78 (1985).

Pourarian, Sinha & Wallace, "Hydrogen Sorption Properties of Non-Stoichiometric $ZnMn_2$-Based Systems", vol. 96, pp. 237-248 (1984).

Libowitz, Hayes & Gibbs, "The System Zr-Ni & Hydrogen", *J. Phys. Chem.*, vol. 62, pp. 76-79 (1958).

Aoki & Masumoto, "Hydrogen Sorption & Desorption Properties of Amorphous Ti-Ni & Hf-Ni Alloys", *Journal of Less Common Metals*, vol. 113, pp. 33-41 (1985).

Machida, et al., "A Study of the Amorphous $Ni_{0.33}Ti_{0.67}$ & $Ni_{0.33}Zr_{0.67}$ Alloy Cathodes for Water Electrolysis Using Electron Spectroscopy for Chemical Analysis", *Journal of Less Common Metals*, vol. 96, pp. 305-313 (1984).

(List continued on next page.)

OTHER PUBLICATIONS

Van Rijswick, "Metal Hydride Electrodes for Electrochemical Energy Storage", *Hydrogen for Energy Storage,* (1977), pp. 261–271.

Proceedings of 11th Rare Earth Conference, Hydrogen in Rare Earth Intermetallics, Buechow et al., Oct. 1974.

The Effect of Aluminum Additions on the Structural and Hydrogen Absorption Properties of $AB_5$ Alloys with Particular Reference to the $LaNi_5Al_{0.5}$ Ternary Alloy System, Mendelsohn et al., Journal of the Less Common Metals, 63, 1979, pp. 193–207.

Hydrogen Absorption in $LaNi_5$ and Related Compounds: Experimental Observations and their Explanation, Van Mal et al., Journal of the Less Common Metals, 35, (1974), pp. 65–76.

Equilibrium Studies on the Systems $ZrCr_2$–$H_2$, $ZrV_2$–$H_2$ and $ZrMo_2$–$H_2$ Between 0° and 900° C., Pepler et al., Transactions of the Metallurgical Society of AIME, 237, (1967), pp. 1593–1600.

HYDROGEN STORAGE HYDRIDE ELECTRODE MATERIALS

Matter enclosed in heavy brackets [ ] appears in the original patent but forms no part of this reissue specification; matter printed in italics indicates the additions made by reissue.

*This application is a continuation of Ser. No. 438,340, filed Nov. 16, 1989, now abandoned, which is a reissue application of Ser. No. 122,042, filed Nov. 17, 1987, U.S. Pat. No. 4,849,205.*

BACKGROUND OF THE INVENTION

1. Field of the Invention

This invention relates to hydrogen storage materials and their electrochemical application. More particularly, this invention relates to the composition of novel materials for rechargeable hydride electrode materials. This invention further relates to a simple but effective method to determine a multi-component alloy as a potential candidate for hydride electrode applications.

2. Description of the Prior Art

Hydrogen can be stored in a heavy cylinder at high pressure as a gas at room temperature, or it can be stored in a well insulated container at low pressure as a liquid at ultra low temperature. The high pressure storage method involves significant safety problems, and relatively little hydrogen can be stored in a given volume of container vessel. The ultra low temperature storage method involves a significant waste of electricity to power cryogenic liquefaction devices, and, because of evaporation, the hydrogen cannot be stored indefinitely.

A preferable way to store hydrogen is to use a solid material which can absorb hydrogen in a reversible manner. This process is known as hydriding. Two examples of hydriding processes are:

$$M(s)+\tfrac{1}{2}H_2(g)\rightarrow MH(s) \quad (1)$$

$$M(s)+\tfrac{1}{2}H_2O+e^-\rightarrow MH(s)+OH^- \quad (2)$$

where M(s) is the solid hydrogen storage material, MH(s) is the solid hydride, $e^-$ is an electron and $OH^-$ is the hydroxyl ion. Equation (1) is a solid-gas reaction process which can be used to store thermal energy. Equation (2), on the other hand, is an electrochemical reaction that can be used to store electrical energy. In both equations, hydrogen is stored during a charge reaction and is released during a discharge reaction.

Not every metal alloy can be used in the above hydriding process. It is also the case that not every metal alloy that can be utilized in the solid-gas reaction (Eq. 1) can be used in the electrochemical reaction (Eq. 2). For example, the hydrogen storage materials: Ti-Zr-Mn-C-V alloys, disclosed in U.S. Pat. No. 4,160,014 are not readily suitable for electrochemical reactions, as for example those involved in a battery application. Another example of hydrogen storage materials is given in Japanese Patent Sho 55-91950 which discloses alloys with the following composition formula: $(V_{1-x}Ti_x)_3Ni_{1-y}M_y$, where M equals Cr, Mn, Fe, and where x and y are defined by: $0.05\leqq x\leqq 0.8$ and $0\leqq y\leqq 0.2$. These materials restrict the amount of Ni+M equal to 25 atomic percent with less than 5 atomic percent of M, and the amount ot Ti+V equal to 75 atomic percent. As a result, in addition to the potential corrosion problem adduced from using these materials, the hydrides of these materials are either very stable at ambient temperature or are of high cost. Consequently, these materials are not readily [useable] *usable* for electrochemical applications.

Among the many hydride materials that have been developed, only a few of them have been tested electrochemically. Examples of such research are U.S. Pat. Nos. 3,824,131, 4,112,199, and 4,551,400. The hydride electrode materials invented primarily by the present inventor and disclosed in U.S. Pat. No. 4,551,400 have superior properties as compared to the hydride electrode materials described in the other patents hereinabove cited. The materials disclosed in the U.S. Pat. No. 4,551,400 are grouped as:

$$[TiV_{1-x}Ni_x]\ TiV_{2-x}Ni_x \text{ where } 0.2\leqq x\leqq 1.0; \quad (a)$$

$$Ti_{2-x}Zr_xV_{4-y}Ni_y, \text{ where } 0\leqq x\leqq 1.50,\ 0.6\leqq y\leqq 3.50, \quad (b)$$

which can be rewritten as $[Ti_{1-x}, Zr_x, V_{2-y}, Ni_y,]$ $Ti_{1-x'}Zr_{x'}V_{2-y'}Ni_{y'}$, where $0\leqq x'\leqq 0.75$, $0.3\leqq y'\leqq 1.75$; and $$Ti_{1-x}Cr_xV_{2-y}Ni_y, \text{ where } 0.2\leqq x\leqq 0.75,\ 0.2\leqq y\leqq 1.0. \quad (c)$$

These materials are all limited to the pseudo $TiV_2$ type alloys with the following composition restriction:

Group (a): Ti=33.3 atomic %, V+Ni=66.7 atomic %;

Group (b): Ti+Zr=33.3 atomic %, V+Ni=66.7 atomic %; and

Group (c): Ti+Cr=33.3 atomic %, V+Ni=66.7 atomic %.

This restriction results in all these materials having one or several weaknesses, especially high cost, short life cycle, and low capacity, as well as in some cases poor rate capability.

A good hydrogen storage material of the class described suitable for electrochemical applications has not been reported to date in the scientific literature, as well as Letters Patent. Particularly there has been no disclosure of how to provide a simple qualitative approach for developing or optimizing hydride materials for storing hydrogen as well as for hydride electrodes. As a result, the common method has been one of a trial-and-error, which has resulted in the expenditure of considerable wasted time, money and human resources.

Consequently, which is needed is a good hydrogen storage electrode material, having at the minimum the following properties:

Excellent hydrogen storage capacity;

superior electrochemical catalyst for hydrogen oxidation;

high hydrogen diffusion rate;

suitable hydrogen equilibrium pressure; and reasonable cost.

To fit the above restrictions, the present invention provides, through the application of thermodynamics, kinetics and electrochemistry, a method for selecting a good hydride candidate suitable for electrochemical applications. More particularly, the composition of advanced hydride electrode materials and the methods of their fabrication are disclosed herein.

SUMMARY OF THE INVENTION

The present invention discloses the following materials, represented by formulae, for hydrogen storage and hydride electrode applications.

$$[Ti_aZr_bNi_cCr_dM_x,]\ Ti_aZr_bNi_cCr_dM_xH_y \text{ or } Ti_aZr_bNi_cCr_dH_y$$

where M equals any of Al, Si, V, Mn, Fe, Co, Cu, Nb, Ag, Pd, and rare earth metals, and where a, b, c, d, and x are defined by: $0.1 \leqq a \leqq 1.4$, $0.1 \leqq b \leqq 1.3$, $0.24 \leqq c \leqq 1.95$, $0.1 \leqq d \leqq 1.4$, and $a+b+c+d=3$, and $0 \leqq x \leqq 0.2$ *and* $y>0$.

$$Ti_aCr_bZr_cNi_dV_{3-a-b-c-d}M_x,$$

where M equals any of Al, Si, Mn, Co, Cu, Fe, Nb, Ag, Pd, and rare earth metals, and where a, b, c, d, and x are defined by: $0.1 \leqq a \leqq 1.3$, $0.1 \leqq b \leqq 1.2$, $0.1 \leqq c \leqq 1.3$, $0.2 \leqq d \leqq 1.95$, [$0.4 \leqq a+b+c+d \leqq 2.9$] $0.5 \leqq a+b+c+d \leqq 2.9$, $0 \leqq x \leqq 0.2$, and for $x=0$ and $b=0.5$, then $a+c \neq 0.5$.

$$Ti_aZr_bNi_cV_{3-a-b-c}M_x,$$

where M equals any of Al, Si, Cr, Mn, Fe, Co, Cu, Nb, Ag, Pd, and rare earth metals, and where a, b, c, and x are defined as: $0.1 \leqq a \leqq 1.3$, $0.1 \leqq b \leqq 1.3$, $0.25 \leqq c \leqq 1.95$, $0 \leqq x \leqq 0.2$, and $0.6 \leqq a+b+c \leqq 2.9$; for $x=0$ then $a+b \neq 1$ and $0.24 \leqq b \leqq 1.3$.

$$Ti_aMn_bV_cNi_dM_x,$$

where M equals any of Al, Si, Cr, Fe, Co, Cu, Nb, Zr, Ag, Pd, and rare earth metals, and were a, b, c, d, and x are defined by: $0.1 \leqq a \leqq 1.6$, $0.1 \leqq b \leqq 1.6$, $0.1 \leqq c \leqq 1.7$, $0.2 \leqq d \leqq 2.0$, $a+b+c+d=3$, and $0 \leqq x \leqq 0.2$.

The materials disclosed by the present invention may be prepared by electric arc, induction or plasma melting under inert atmosphere. The present invention also provides methods of storing hydrogen by the materials disclosed.

The present invention further discloses a general method to develop a potential multicomponent alloy $A_aB_bC_c$ . . . for hydrogen storage and rechargeable hydride electrode applications. This method consists of the following two steps:

Step 1: Let the candidate alloy $A_aB_bC_c$ . . . contain at least 5 mole percent, but less than 65 mole percent, of nickel metal in the composition, preferably, 15 to 45 mole percent of nickel; and Step 2. Set the proper numbers of a, b, c, . . . in the alloy $A_aB_bC_c$ . . . such that it has a calculated heat of hydride formation, $H_h$, between −3.5 and −9.0 Kcal/mole H, preferably −4.5 to −8.5 Kcal/mole H. The equation for the $H_h$ calculation is:

$$H_h=(aH_h(A)+bH_h(B)+cH_h(C)+\ldots)/(a+b+c+\ldots)+K, \quad (3)$$

where $H_h(A)$, $H_h(B)$, $H_h(C)$, . . . are the heat of hydride formation of the metals A, B, C, . . . , respectively, in Kcal/mole H, and where K is a constant related to the heat of formation of the alloy $A_aB_bC_c$ . . . and the heat of mixing of hydrides of A, B, C, . . . The values of K are: 0.5, −0.2, and −1.5 for a+b+c+ . . . equal to 2, 3, 6, respectively. However, for practical purposes, the value of K can be set to zero. The values of the heat of hydride formation of metal elements can be found elsewhere, exemplified by the following:

Mg: −9.0, Ti: −15.0, V: −7.0, Cr: −1.81, Mn: −2.0, Fe: 4.0, Co: 4.0, Ni: 2.0, Al: −1.38, Y: −27.0, Zr: −19.5, Nb: −9.0, Pd: −4.0, Mo: −1.0, Ca: −21.0, and rare earth metals: −25.0, all in units of Kcal/mole H.

For the alloy with a+b+c+ . . . other than 2, 3, and 6, K can simply be set equal to zero, or the formula may be normalized to the nearest pseudo type and therefore its heat of hydride formulation can still be obtained by equation (3).

DETAILED DESCRIPTION OF THE PREFERRED EMBODIMENTS

The present invention discloses four main groups of materials which can serve as a hydride for reversible hydrogen storage applications, and more particularly, can serve as a negative electrode active material for [elctrochemical applications.] *electrochemical applications.*

The first group of materials contains titanium, zirconium, nickel and chromium. It may also include another element or elements such as aluminum, vanadium, manganese, iron, cobalt, copper, niobium, silicon, silver and palladium, or rare earth metals. The composition of an alloy in this group can be represented by the following formula:

$$Ti_aZr_bNi_cCr_dM_x,$$

where M equals any of Al, Si, V, Mn, Fe, Co, Cu, Nb, Ag, Pd, and rare earth metals, and where a, b, c, d, and x are defined by: $0.1 \leqq a \leqq 1.4$, $0.1 \leqq b \leqq 1.3$, $0.25 \leqq c \leqq 1.95$, $0.1 \leqq d \leqq 1.4$, $a+b+c+d=3$, and $0 \leqq x \leqq 0.2$. Preferably, $0.25 \leqq a \leqq 1.0$, $0.2 \leqq b \leqq 1.0$, $0.8 \leqq c \leqq 1.6$, and $0.3 \leqq d \leqq 1.0$.

The second group of materials of the present invention contains titanium, chromium, zirconium, nickel and vanadium. Another element or elements can be added, such as aluminum, silicon, manganese, iron, cobalt, copper, niobium, silver, palladium, or rare earth metals. The composition of an alloy in this group is expressed by the following formula:

$$Ti_aCr_bZr_cNi_dV_{3-a-b-c-d}M_x,$$

where M equals any of Al, Si, Mn, Co, Cu, Fe, Nb, Ag, Pd, and rare earth metals, and where a, b, c, d, and x are defined by: $0.1 \leqq a \leqq 1.3$, $0.1 \leqq b \leqq 1.2$, $0.1 \leqq c \leqq 1.3$, $0.2 \leqq d \leqq 1.95$, [$0.4 \leqq a+b+c+d \leqq 2.9$] $0.5 \leqq a+b+c+d \leqq 2.9$, $0 \leqq x \leqq 0.2$, and for $x=0$ and $b=0.5$, then $a+c \neq 0.5$. Preferably, $0.15 \leqq a \leqq 0.1$, $0.15 \leqq b \leqq 1.0$, $0.2 \leqq c \leqq 1.0$, $0.4 \leqq d \leqq 1.7$, and $1.5 \leqq a+b+c+d \leqq 2.3$.

*An alternative to the second group of materials is the composition:* $Ti_aCr_aZr_cNi_dV_{3-2a-c-d}M_x$ *wherein M equals any of Al, Si, Mn, Co, Cu, Fe, Nb, Ag, Pd, and rare earth metals, and where a, c, d, and x are defined by:* $0.1 \leqq a \leqq 1.2$, $0.1 \leqq c \leqq 1.2$, $0.2 \leqq d \leqq 1.95$, $0.9 \leqq 2a+c+d \leqq 2.8$, *and* $0 \leqq x \leqq 0.2$.

*Another alternative is a composition of the formula:* $Ti_aCr_aZr_{1-2a}Ni_dV_{2-d}M_x$ *where M equals any of Al, Si, Mn, Co, Cu, Fe, Nb, Ag, Pd, and rare earth metals, and where a, d, and x are defined by:* $0.1 \leqq a \leqq 0.45$, $0.25 \leqq d \leqq 1.95$, *and* $0 \leqq x \leqq 0.2$.

*Another alternative is the following composition formula:* $Ti_aCr_aZr_cNi_{2-c}V_{1-2a}M_x$ *where M equals any of Al, Si, Mn, Co, Cu, Fe, Nb, Ag, Pd, and rare earth metals,*

*and wherein a, c, and x are defined by: $0.1 \leqq a \leqq 0.45$, $0.2 \leqq c \leqq 1.2$, and $0 \leqq x \leqq 0.2$.*

The third group of materials described by the present invention contains titanium, zirconium, nickel and vanadium. Another element or elements can be added, such as aluminum, silicon, manganese, iron, cobalt, copper, niobium, silver, palladium, or rare earth metals. The composition of an alloy in this group is expressed by the following formula:

$$Ti_aZr_bNi_cV_{3-a-b-c}M_x,$$

where M equals any of Al, Si, Cr, Mn, Fe, Co, Cu, Nb, Ag, Pd, and rare earth metals, and where a, b, c, and x are defined as: $0.1 \leqq a \leqq 1.3$, $0.1 \leqq b \leqq 1.3$, $0.25 \leqq c \leqq 1.95$, $0 \leqq x \leqq 0.2$, and $0.6 \leqq a+b+c \leqq 2.9$; for $x=0$ then $a+b \neq 1$ and $0.24 \leqq b \leqq 1.3$. Preferably, $0.15 \leqq a \leqq 0.8$, $0.2 \leqq b \leqq 0.8$, $0.5 \leqq c \leqq 1.5$, and $1.5 \leqq a+b+c \leqq 2.5$.

*An alternative composition formula is: $Ti_aZr_{y-a}Ni_cV_{3-y-c}M_x$ wherein M equals any of Al, Si, Cr, Mn, Fe, Co, Cu, Nb, Ag, Pd, and rare earth metals, and where a, c, x, and y are defined as: $0.1 \leqq a \leqq 1.3$, $0.2 \leqq c \leqq 1.95$, $0 \leqq x \leqq 0.2$, and $0.7 \leqq y \leqq 1.6$.*

The fourth group of materials according to the present invention contains titanium, manganese, nickel, and vanadium. Another element or elements can be added, such as aluminum, silicon, iron, cobalt, copper, zirconium, niobium, silver, palladium, or rare earth metals. The composition of an alloy in this group is expressed by the following formula:

$$Ti_aMn_bV_cNi_dM_x,$$

where M equals any of Al, Si, Cr, Fe, Co, Cu, Nb, Zr, Ag, Pd, and rare earth metals, and were a, b, c, d, and x are defined by: $0.1 \leqq a \leqq 1.6$, $0.1 \leqq b \leqq 1.6$, $0.1 \leqq c \leqq 1.7$, $0.2 \leqq d \leqq 2.0$, $a+b+c+d=3$, and $0 \leqq x \leqq 0.2$. Preferably, $0.5 \leqq a \leqq 1.3$, $0.3 \leqq b \leqq 1.0$, $0.6 \leqq c \leqq 1.5$, and $1.4 \leqq a+b+c \leqq 2.7$.

The present invention also provides a simple method to select the composition of a multicomponent alloy for hydrogen storage and rechargeable hydride electrode applications.

The reaction mechanisms on a hydride electrode are very different from that of an [electrocatallytic electrode,] *electrocatalytic electrode,* rode, such as those used for water electrolysis or fuel cells. A hydride electrode not only serves as an electrocatalyst for hydrogen oxidation (during discharge) and water electrolysis (during charge), but also serves as a medium for the storage and release of hydrogen. Because of these dual functions, some researchers have suggested the use of a surface coating to improve the surface catalytic property of a hydride electrode to boost the rate capability. However, this approach can only give a very limited improvement. The surface coating has a very limited domain, and can be easily destroyed by swelling and shrinking processes during the course of the charge and discharge cycles due to the accompanying hydriding and dehydriding of the material during these cycles, respectively. The best way to guarantee a good rate capability of an electrode is to enhance the intrinsic property of a hydrogen storage alloy such that every part of the material body has good catalytic function in addition to hydrogen storage function.

According to the present invention, the alloy $A_aB_bC_c \ldots$ of A, B, C, . . . elements should contain at least 5 mole percent of nickel to have a resonable rate capability, but not contain more than 65 mole percent of nickel, to insure a reasonable amount of hydrogen storage capacity. Preferably, the nickel content is in the range of between 15 to 45 mole percent.

In addition to the restriction of nickel content, according to the present invention, the alloy should meet the hydrogen pressure and bulk diffusion rate requirements setforth hereinabove. The material $A_aB_bC_c \ldots$ should have a calculated heat of hydride formation (i.e., partial molar heat of enthalpy of hydrogen), $H_h$ in the range of between $-3.5$ and $-9.0$ Kcal/mole H. Preferably this heat, $H_h$, is between $-4.5$ and $-8.5$ Kcal/mole H. The heat of hydride formation, $H_h$, of an alloy $A_aB_bC_c \ldots$ can be calculated through the following thermodynamic cycle:

$$\begin{array}{ccccc}
A_aB_bC_c\ldots & + & n/2\ H_2 & \xrightarrow{n\,H_h} & A_aB_bC_c\ldots H_n \\
\downarrow -H_f & & \downarrow \text{O} & & \uparrow n\,H^m \\
({}_aA + {}_bB + {}_cC + \ldots) & + & n/2\ H_2 & \xrightarrow{\Sigma H_h(i)} & ({}_aAH + {}_bBH + {}_cCH + \ldots)
\end{array}$$

where $H_f$ is the heat of formation of the alloy $A_aB_bC_c \ldots$, $H^m$ is the heat of mixing of hydrides AH, BH, CH, . . . , and each is with the respective heat of hydride formation $H_h(i)$, i.e., $H_h(A)$, $H_h(B)$, $H_h(C)$, . . . Kcal/mole H.

For a $+b+c+ \ldots =n$, it is clear from the above thermodynamic cycle that the heat of hydride formation of the alloy $A_aB_bC_c \ldots$, $H_h$, is:

$$H_h=(aH_h(A)+bH_h(B)+cH_h(C)+\ldots)/(a+b+c+\ldots)-H_f/(a+b+c+\ldots)+H^m.$$

The mixing of hydrides can be considered the mixing of metals with hydrogen as common species. This process is similar to the mixing of binary [fluorides, where the fluoride] *fluorides, where the fluoride* ions are the common species. From knowledge of [flouride] *fluoride* systems, the values of the heat of mixing of binary hydrides to form a relatively stable multicomponent hydride, should be between $-2$ and $-5$ Kcal/mole H, depending upon the metals used. Let $H^m$ equal $-2.5$ Kcal/mole H. On the other hand, in general, the heat of formation of a stable metal alloy, $H_f$, is about $-6.0 \pm 3.0$ Kcal/mole alloy.

Comparing the values of $H^m$ and $H_f$, equation 3, above, can be obtained. Therefore, the heat of hydride formation, $H_h$, of the alloy $A_aB_bC_c \ldots$ can be thereby calculated.

Thus, the steps 1 and 2 described above can be used to provide a simple quantitative method of selecting the composition of a multicomponent alloy for hydrogen storage and hydride electrode applications. Neglecting the small contribution due to M in Groups 1–4, the heat of hydride formation can be calculated by the following equations:

The heat of hydride formation of an alloy in the first group of materials having a composition represented by the formula:

$Ti_aZr_bNi_cCr_dM_x$ can be calculated by the following equation:

$$H_h = -5.0a - 6.5b + 0.67c - 0.67d \text{ Kcal/mole H.} \quad (4)$$

where $a+b+c+d=3$.

A suitable alloy in this group should have the value of $H_h$ in the range between −3.5 and −9.0 Kcal/mole H, and preferably between −4.5 and −8.5 Kcal/mole H.

The heat of hydride formation of an alloy in the second group of the materials having composition represented by the formula:

$Ti_aCr_bZr_cNi_dV_{3-a-b-c-d}M_x$ can be calculated by the following equation:

$$H_h = -2.65a + 1.66b - 4.14c + 2.98d - 7.0 \text{ Kcal/mole H.} \quad (5)$$

A suitable alloy in this group should have a value of $H_h$ in the range of between −3.5 and −9.0 Kcal/mole H, and preferably between −4.5 and −8.5 Kcal/mole H.

The heat of hydride formation of an alloy in the third group of the materials having a composition represented by the formula:

$Ti_aZr_bNi_cV_{3-a-b-c}M_x$ can be calculated by the following equation:

[$H_h = -2.65a - 4.14 + 2.98C - 7.0$ Kcal/mole H.]

$$H_h = 2.65a - 4.14b + 2.98c - 7.0 \text{Kcal/mole H.} \quad (6)$$

A suitable alloy in this group should have a value of $H_h$ in the range of between −3.5 and −9.0 Kcal/mole H, and preferably between −4.5 and −8.5 Kcal/mole H.

The heat of hydride formation of an alloy in the fourth group of the material having a composition represented by the formula:

$Ti_aMn_bNi_cV_dM_x$ can be calculated by the following equations:

$$H_h = (-15.0a - 2.0b + 2.0c - 7.0d)/(a+b+c+d) \text{ Kcal/mole H.} \quad (7)$$

A suitable alloy in this group should have a value of $H_h$ in the range between −3.5 and −9.0 Kcal/mole H, and preferably between −4.5 and −8.5 Kcal/mole H.

The multicomponent alloy in accordance with the present invention can be prepared by induction heating, arc or plasma melting, under an inert atmosphere. A higher temperature as well as several remelting runs will be useful to [obtian] *obtain* a more homogeneous material. A small amount of alkalai metal or alkaline earth can be used as a deoxidizing agent during the melting process.

To store gaseous phase hydrogen, the active materials of the invention can be charged at 100 to 300 p.s.i. hydrogen after the air in the whole system has been evacuated. Moderate temperature of between 100 to 200 degrees Centigrade will accelerate the hydriding or dehydriding process. It is [prefered] *preferred* to first granulate the material into small particles in order to ensure complete activation of the material in the hydrogen.

For the electrochemical application, an electrode containing the active material of the present invention is first prepared. The electrode is made in the following manner. The active material powder with or without binder, such as pure nickel, aluminum or copper (up to 10 wt. %), is cold pressed onto a nickel grid or a nickel plated mild steel grid with a pressure of between 5 to 20 tons per square inch. The resulting electrode may be subject to a sintering process (at 600 to 1100 degrees C. for 3 to 10 minutes under protective atmosphere) to enhance the strength of the body structure. Finally, the electrode is activated electrochemically at an electric current density of up to 50 to 100 mA/g rate (cathodic charging followed by anodic discharging) for a couple or several cycles in an alkaline solution. The electrode is then ready to combine with a positive electrode such as an Ni-positive electrode for an electrochemical application.

*The invention pertains to a material for hydrogen storage and a hydride electrode, said material comprising the composition formula selected from the group consisting of:*

$Ti_aZr_bNi_cCr_dM_xM_y$

*where M equals any of Al, Si, V, Mn, Fe, Co, Cu, Nb, Ag, Pd, and rare earth metals, and where a, b, c, d, and x are defined by:* $0.1 \leqq a \leqq 1.4$, $0.1 \leqq b \leqq 1.3$, $0.25 \leqq c \leqq 1.95$, $0.1 \leqq d \leqq 1.4$, $a+b+c+d=3$, $0 \leqq x \leqq 0.2$, *and* $y>O$ *wherein* $1.2 \leqq Ti+Zr \leqq 2.7$;

$Ti_aCr_bZr_cNi_dV_{3-a-b-c-d}M_x$,

*and hydrides thereof,*

*where M equals any of Al, Si, Mn, Co, Cu, Fe, Nb, Ag, Pd and rare earth metals, and where a, b, c, d, and x are defined by:* $0.1 \leqq a \leqq 1.3$, $0.1 \leqq b \leqq 1.2$, $0.1 \leqq c \leqq 1.3$, $0.2 \leqq d \leqq 1.95$, $0.5 \leqq a+b+c+d \leqq 2.9$, $0 \leqq x \leqq 0.2$, *wherein* $0.2 \leqq Ti+Zr \leqq 0.80$ *and* $0.1 \leqq V \leqq 1.4$ *and for* $x=0$, *and* $b=0.5$, *then* $a+c \neq 0.5$.

*The invention also pertains to a material for hydrogen storage and a hybride electrode, wherein said composition formula is:*

$Ti_aMn_bV_cNi_dM_x$

*where M equals any of Al, Si, Fe, Co, Cu, Nb, Ag, Pd, and rare earth metals, and where a, b, c, d, and x are defined by:* $1.2 \leqq a \leqq 1.6$, $0.3 \leqq b \leqq 1.0$, $0.1 \leqq c \leqq 1.7$, $0.2 \leqq d \leqq 2.0$, $a+b+c+d=3$, $0<x \leqq 0.2$.

*The invention also pertains to a material for hydrogen storage and a hybride electrode, wherein said material having composition formula consisting of:*

$Ti_aZr_bNi_cCr_dM_x$;

*and hydrides thereof, where M is selected from the group consisting of Al, Si, V, Mn, Fe, Co, Cu, Nb, Ag, Pd and rare earth metals, and where a, b, c, d, and x are defined by:* $0.25 \leqq a \leqq 1.0$, $0.2 \leqq b \leqq 1.0$, $0.8 \leqq c \leqq 1.6$, $0.3 \leqq d \leqq 1.0$, $a+b+c+d=3$, 3, $0 \leqq x \leqq 0.2$, *wherein* $1.2 \leqq Ti+Zr \leqq 2.0$.

*The invention also pertains to a material for hydrogen storage and a hydride electrode, wherein said material having composition formula consisting of:*

$Ti_aCr_bZr_cNi_dV_{3-a-b-c-d}M_x$,

*and hydrides thereof, where M is selected from the group consisting of Al, Si, Mn, Co, Cu, Fe, Nb, Ag, Pd, and rare earth metals, and where a, b, c, d, and x are defined by:* $0.15 \leqq a \leqq 1.0$, $0.15 \leqq b \leqq 1.0$, $02. \leqq c \leqq 1.0$, $0.4 \leqq d \leqq 1.7$, $1.5 \leqq a+b+c+d \leqq 2.3$ *and* $0 \leqq x \leqq 0.2$, $0.35 \leqq Ti+Zr \leqq 0.8$, $0.7 \leqq V \leqq 1.4$ *and for* $x=0$, $b=0.5$, *then* $a+c \neq 0.5$.

EXAMPLE 1

A first group of materials is represented by the formula:

$Ti_aZr_bNi_cCr_dM_x$, where M equals any of Al, Si, V, Mn, Fe, Co, Cu, Nb, and rare earth metals, and where a, b, c, d and x are defined by: $0.1 \leqq a \leqq 1.4$, $0.1 \leqq b \leqq 1.3$, $0.25 \leqq c \leqq 1.95$, $0.1 \leqq d \leqq 1.4$, $a+b+c+d=3$, and $0 \leqq x \leqq 0.2$.

Alloys having compositions in this first group are given in Table 1. Proper amounts of pure metal elements were weighed, mixed, pressed into pellets, and then melted together by arc or induction heating under argon atmosphere. Small chunk samples ranging from 100 to 300 mg. were tested electrochemically in a 4M KOH solution. A nickel wire or nickel positive electrode was used as the counter electrode. The electrochemical capacity at a 100 mA/g discharge rate of these alloys measured down to −700 mV versus an Hg/HgO reference electrode cut-off potential is shown in Table 1. Material in this group have high capacity, long life cycles and good rate capability. In this first group, materials given in Table 1 also show the calculated heat of hydride formation in the range of between −4.5 and −8.5 Kcal/mole H in agreement with the rules stated hereinabove.

EXAMPLE 2

A second group of materials is represented by the formula:

$Ti_aCr_bZr_cNi_dV_{3-a-b-c-d}M_x$, where M equals any of Al, Si, Mn, Co, Cu, Fe, Nb, and rare earth metals, and where a, b, c, d, and x are defined by: $0.1 \leqq a \leqq 1.3$, $0.1 \leqq b \leqq 1.2$, $0.1 \leqq c \leqq 1.3$, $0.2 \leqq d \leqq 1.95$, [$0.4 \leqq a+b+c+d \leqq 2.9$] $0.5 \leqq a+b+c+d \leqq 2.9$, and $0 \leqq x \leqq 0.2$.

Alloys having compositions in this second group were prepared and tested in accordance with the procedures described in Example 1. Some of the experimental results are given in Table 1. Materials in this group have high capacity, long life cycles and good rate capability. In this second group, materials listed in Table 1 also have the calculated heat of hydride formation in the range of between −4.5 and −8.5 Kcal/mole H, in agreement with the rules stated hereinabove.

EXAMPLE 3

A third group of materials is represented by the formula:

$Ti_aZr_bNi_cV_{3-a-b-c}M_x$, where M equals any of Al, Si, Cr, Mn, Fe, Co, Cu, Nb, and rare earth metals, and where a, b, c, and x are defined as: $0.1 \leqq a \leqq 1.3$, $0.1 \leqq b \leqq 1.3$, $0.25 \leqq c \leqq 1.95$, $0 \leqq x \leqq 0.2$, and $0.6 \leqq a+b+c \leqq 2.9$; for $x=0$ then $a+b \neq 1$ and $0.24 \leqq b \leqq 1.3$.

Alloys having compositions in this group were prepared and tested in accordance with the procedure described in Example 1. Some of the experimental results are also given in Table 1. In this third group, materials listed in Table 1 have the calculated heat of hydride formation in the range between −4.5 and −8.5 Kcal/mole H, in agreement with the rules stated hereinabove.

EXAMPLE 4

A fourth group of materials is represented by the formula:

$Ti_aMn_bV_cNi_dM_x$, where M equals any of Al, Si, Cr, Fe, Co, Cu, Nb, Zr, and rare earth metals, and were a, b, c, d, and x are defined by: $0.1 \leqq a \leqq 1.6$, $0.1 \leqq b \leqq 1.6$, $0.1 \leqq c \leqq 1.7$, $0.2 \leqq d \leqq 2.0$, $a+b+c+d=3$, and $0 \leqq x \leqq 0.2$.

Alloys having compositions in this group were prepared and tested in accordance with the procedures given in Example 1. Some of the experimental results are given in Table 1. The cycle life and rate capability of the alloys in this group are excellent. In this fourth group, materials shown in Table 1 have the calculated heat of hydride formation in the range of between −4.5 and −8.5 Kcal/mole H, in agreement with the rules stated hereinabove.

TABLE 1

Electrochemical Capacity and Heat of Hydride Formation of Materials

| Material Composition | Capacity[1] | $H_h$[2] |
|---|---|---|
| Group 1: $Ti_aZr_bNi_cCr_dM_x$ | | |
| $Ti_{0.3}Zr_{1.0}Ni_{1.4}Cr_{0.3}$ | 280 | −7.27 |
| $Ti_{0.4}Zr_{0.8}Ni_{1.4}Cr_{0.4}$ | 290 | −6.53 |
| $Ti_{0.5}Zr_{0.8}Ni_{1.2}Cr_{0.5}$ | 300 | −7.23 |
| $Ti_{0.5}Zr_{0.7}Ni_{1.3}Cr_{0.5}$ | 290 | −6.52 |
| $Ti_{0.5}Zr_{0.6}Ni_{1.4}Cr_{0.5}$ | 275 | −5.80 |
| $Ti_{0.5}Zr_{0.8}Ni_{1.1}Cr_{0.5}Mn_{0.1}$ | 265 | −7.37 |
| Group 2: $Ti_aCr_bZr_cNi_dV_{3-a-b-c-d}M_x$ | | |
| $Ti_{0.4}Cr_{0.4}Zr_{0.2}Ni_{0.6}V_{1.4}$ | 295 | −6.43 |
| $Ti_{0.3}Cr_{0.3}Zr_{0.5}Ni_{1.15}V_{0.45}$ | 268 | −7.18 |
| $Ti_{0.3}Cr_{0.3}Zr_{0.4}Ni_{0.6}V_{1.4}$ | 330 | −7.16 |
| $Ti_{0.35}Cr_{0.35}Zr_{0.5}Ni_{1.0}V_{0.8}$ | 285 | −6.43 |
| $Ti_{0.3}Cr_{0.3}Zr_{0.5}Ni_{0.7}V_{1.2}Cu_{0.1}$ | 310 | −7.28 |
| Group 3: $Ti_aZr_bNi_cV_{3-a-b-c}M_x$ | | |
| $Ti_{0.6}Zr_{0.5}Ni_{1.1}V_{0.8}$ | 310 | −7.38 |
| $Ti_{0.7}Zr_{0.6}Ni_{1.3}V_{0.4}$ | 290 | −7.47 |
| $Ti_{0.7}Zr_{0.4}Ni_{1.3}V_{0.6}$ | 280 | −6.63 |
| $Ti_{0.65}Zr_{0.35}Ni_{1.30}V_{0.70}$ | 305 | −6.38 |
| $Ti_{0.3}Zr_{0.8}Ni_{1.3}V_{0.6}$ | 275 | −7.23 |
| $Ti_{0.5}Zr_{0.5}Ni_{1.1}V_{0.7}Cu_{0.2}$ | 250 | −6.38 |
| Group 4: $Ti_aMn_bV_cNi_dM_x$ | | |
| $Ti_{1.0}Mn_{0.5}V_{0.6}Ni_{0.9}$ | 280 | −6.13 |
| $Ti_{1.1}Mn_{0.5}V_{0.5}Ni_{0.9}$ | 300 | −6.40 |
| $Ti_{1.2}Mn_{0.45}V_{0.45}Ni_{0.9}$ | 310 | −6.75 |
| $Ti_{1.3}Mn_{0.39}V_{0.38}Ni_{0.93}$ | 315 | −7.03 |
| $Ti_{1.1}Mn_{0.5}V_{0.5}Ni_{0.9}Co_{0.1}$ | 280 | −6.40 |

[1] mAh/g (at 100 mA/g)

[2] Kcal/mole H. The heats of hydride formation are calculated from the equations 4–7, hereinabove.

What is claimed is:

1. A material for hydride hydrogen storage and a hydride electrode, said material comprising the composition formula selected from the group consisting of:

$Ti_aZr_bNi_cCr_dM_xH_y$ where M equals any of Al, Si, V, Mn, Fe, Co, Cu, Nb, Ag, Pd, and rare earth metals, and where a, b, c, d, and x are defined by: $0.1 \leqq a \leqq 1.4$, $0.1 \leqq b \leqq 1.3$, $0.25 \leqq c \leqq 1.95$, $0.1 \leqq d \leqq 1.4$, $a+b+c+d=3$, $0 \leqq x \leqq 0.2$, and $y<0$ *wherein* $Ti+Zr \leqq 1.2$;

$$Ti_aCr_bZr_cNi_dV_{3-a-b-c-d}M_x,$$

*and hydrides thereof,* where M equals any of Al, Si, Mn, Co, Cu, Fe, Nb, Ag, Pd and rare earth metals, and where a, b, c, d, and x are defined by: $0.1 \leqq a \leqq 1.3$, $0.1 \leqq b \leqq 1.2$, $0.1 \leqq c \leqq 1.3$, $0.2 \leqq d \leqq 1.95$, [0.4] *0.5* $\leqq a+b+c+d \leqq 2.9$, $0 \leqq x \leqq 0.2$, and for $x=0$, and $b=0.5$, then $a+c \neq 0.5$ and [$b \geqq 0.25$] *wherein* $Ti+Zr \leqq 0.80$ *and* $V \leqq 1.4$[;

$$Ti_aZr_bNi_cV_{3-a-b-c}M_x,$$

where M equals any of Al, Si, Cr, Mn, Fe, Co, Cu, Nb, Ag, Pd, and rare earth metals, and where a, b, c, and x are defined as: $0.1 \leqq a \leqq 1.3$, $0.1 \leqq b \leqq 1.3$, $0.25 \leqq c \leqq 1.95$, $0 \leqq x \leqq 0.2$, and $0.6 \leqq a+b+c \leqq 2.9$; and for $X=0$ then $a+b \neq 1$ and $0.24 \leqq b \leqq 1.3$; and $$Ti_aMn_bV_cNi_dM_x,$$

where M equals any of Al, Si, Cr, Fe, Co, Cu, Nb, Zr, Ag, Pd, and rare earth metals, and were a, b, c, d, and x are defined by: $0.1 \leqq a \leqq 1.6$, $0.1 \leqq b \leqq 1.6$, $0.1 \leqq c \leqq 1.7$, $0.2 \leqq d \leqq 2.0$, $a+b+c+d=3$, and $0 \leqq x \leqq 0.2$, and for $x=0$ then $b+d \neq 0.75$]

2. A hydride of the material [o] *of* claim 1 comprising the composition formula selected from the group consisting of:

$$Ti_aCr_bZr_cNi_dV_{3-a-b-c-d}M_x,$$

where M equals any of Al, Si, Mn, Co, Cu, Fe, Nb, Ag, Pd, and rare earth metals, and where a, b, c, d, and x are defined by: $0.1 \leqq a \leqq 1.3$, $0.1 \leqq b \leqq 1.2$, [.0] *0.1* $\leqq c \leqq 1.3$, $0.2 \leqq d \leqq 1.95$, [0.4] *0.5* $\leqq a+b+c+d \leqq$ [2.4] *2.9*, $0 \leqq x \leqq 0.2$ [, and for $x=0$, and $b=0.5$, then $a+c \neq 0.5$ and $b \geqq 0.25$;

$$Ti_aZr_bNi_cV_{3-a-b-c}M_x,$$

where M equals any of Al, Si, Cr, Fe, Co, Cu, Nb, Ag, Pd, and rare earth metals, and were a, b, c, d and x are defined as: $0.1 \leqq a \leqq 1.3$, $0.1 \leqq b \leqq 1.3$, $0.25 \leqq c \leqq 1.95$, $0 \leqq x \leqq 0.2$, and $0.6 \leqq a+b+c \leqq 2.9$, and for $x=0$ then $a+b \neq 1$ and $0.24 \leqq b \leqq 1.3$: and $$Ti_aMn_bV_cNi_dM_x,$$

where M equals any of Al, Si, Cr, Fe, Co, Cu, Nb, Zr, Ag, Pd, and rare earth metals, and where a, b, c, d, and x are defined by: $0.1 \leqq a \leqq 1.6$, $0.1 \leqq b \leqq 1.6$, $0.1 \leqq c \leqq 1.7$, $0.2 \leqq d \leqq 2.0$, $a+b+c+d=3$ and $0 \leqq x \leqq 0.2$, and for $x=0$ then $b+d \neq 0.75$].

3. The material of claim 1 in the form of at least one hydride electrode for an electrochemical energy storage system.

4. A material as defined in claim 1, wherein said composition formula is $$Ti_aZr_bNi_cCr_dH_y,$$

where a, b, c, and d are defined by: $0.1 \leqq a \leqq 1.4$, $0.1 \leqq b \leqq 1.3$, $0.25 \leqq c \leqq 1.95$, $0.1 \leqq d \leqq 1.4$, $y>0$ and $a+b+c+d=3$.

5. The material of claim 4 in the form of at least one hydride electrode for an electrochemical energy storage system.

6. A material as defined in claim 1, wherein said composition formula is:

$$Ti_aCr_bZr_cNi_dV_{3-a-b-c-d},$$

where a, b, c, and d, are defined by: $0.1 \leqq a \leqq 1.3$, [$0.25 \leqq b \leqq 1.2$] *$0.15 \leqq b \leqq 1.0$*, $0.1 \leqq c \leqq 1.3$, $0.2 \leqq d \leqq 1.95$[, $0.4 \leqq a+b+c+d \leqq 2.9$, and if $b=0.5$, then $a+c \neq 0.5$].

7. A hydride of the material of claim 6.

8. The material of claim [6] *7* in the form of at least one hydride electrode for an electrochemical energy storage system.

[9. A material as defined in claim 1, wherein said composition formula is $$Ti_aZr_bNi_cV_{3-a-b-c},$$

where a, b, and c are defined as: $0.1 \leqq a \leqq 1.3$, $0.24 \leqq b \leqq 1.3$, $a+b-1$, $0.25 \leqq c \leqq 1.95$, and $0.6 \leqq a+b+c \leqq 2.9$.]

[10. A hydride of the material of claim 9.]

[11. The material of claim 10 in the form of at least one hydride electrode for an electrochemical energy storage system.]

[12. A material as defined in claim 1, wherein said composition formula is $$Ti_aMn_bV_cNi_d,$$

were a, b, c, and d, are defined by: 1.6, $0.1 \leqq a \leqq 0.1 \leqq b \leqq 1.6$, $0.1 \leqq c \leqq 1.7$, $0.2 \leqq d \leqq 2.0$, $b+d \neq 0.75$ and $a+b+c+d=3$.]

[13. A hydride of the material of claim 12.]

[14. The material of claim 13 in the form of at least one hydride electrode for an electrochemical energy storage system.]

15. A material [as defined in claim 1,] *for hydrogen storage and a hydride electrode,* wherein said composition formula is $$Ti_aMn_bV_cNi_dM_x,$$

where M equals any of Al, Si, [Cr,] Fe, Co, Cu, Nb, [Zr,] Ag, Pd, and rare earth metals, and [were] *where* a, b, c, d, and x are defined by: $0.1 \leqq a \leqq 1.6$, [$0.1 \leqq b \leqq 1.6$] *$0.3<b<1.0$*, $0.1 \leqq c \leqq 1.7$, $0.2 \leqq d \leqq 2.0$, $a+b+c+d=3$ and [$0 \leqq x \leqq 0.2$] *$0<x \leqq 0.2$ and* $Ti+Zr \geqq 1.2$.

16. A hydride of the material of claim 15.

17. The material of claim 15 in the form of at least one hydride electrode for an electrochemical energy storage system.

18. A material as defined in claim 1, wherein said composition formula $$Ti_aCr_aZr_cNi_dV_{3-2a-c-d}M_x,$$

where M equals any of Al, Si, Mn, Co, Cu, Fe, Nb, Ag, Pd, and rare earth metals, and where a, c, d, and x are defined by: [0.25] *0.1* $\leqq a \leqq 1.2$, $0.1 \leqq c \leqq 1.2$, $0.2 \leqq d \leqq 1.95$, $0.9 \leqq 2a+c+d \leqq 2.8$, and $0 \leqq x \leqq 0.2$.

19. A hydride of the material of claim 18.

20. The material of claim [18] *19* in the form of at least one hydride electrode for an electrochemical energy storage system.

21. A material as defined in claim 1, wherein the composition formula is $$Ti_aCr_bZr_{1-a-b}Ni_dV_{2-d}M_x,$$

where M equals any of Al, Si, Mn, Co, Cu, Fe, Nb, Ag, Pd, and rare earth metals, and where a, b, d, and x are defined by: $0.1 \leqq a \leqq 0.8$, $0.1 \leqq b \leqq 0.8$, $0.25 \leqq d \leqq 1.95$, $0 \leqq x \leqq 0.2$, [and for $x=0$, then $b \neq 0.5$ and $b \geqq 0.25$].

22. A hydride of the material of claim 21.

23. The material of claim [21] *22* in the form of at least one hydride electrode for an electrochemical energy storage system.

24. A material as defined in claim [22] *21*, wherein the composition formula is:

$$Ti_aCr_aZr_{1-2a}Ni_dV_{2-d}M_x,$$

where M equals any of Al, Si, Mn, Co, Cu, Fe, Nb, Ag, Pd, and rare earth metals, and where a, d, and x are defined by: $0.1 \leqq a \leqq 0.45$, $0.25 \leqq d \leqq 1.95$, $0 \leqq x \leqq 0.2$ [and when $x=0$ then $a \geqq 0.25$].

25. A hydride of the material of claim 24.

26. The material of claim [19] *25* in the form of at least one hydride electrode for an electrochemical energy storage system.

27. A material as defined in claim 1, wherein the composition formula is $$Ti_aCr_aZr_cNi_{2-c}V_{1-2a}M_x,$$

where M equals any of Al, Si, Mn, Co, Cu, Fe, Nb, Ag, Pd, and rare earth metals, and where a, c, and x are defined by: $0.1 \leqq a \leqq 0.45$, $0.2 \leqq c \leqq 1.2$, $0 \leqq x \leqq 0.2$ [and if $x=0$, then $a \geqq 0.25$].

28. A hybride of the material of claim 27.

29. The material of claim [27] *28* in the form of at least one hydride electrode for an electrochemical energy storage system.

[30. A material as defined in claim 10, wherein the composition formula is $$Ti_aZr_{1.2+t-a-d}Ni_{1.8-t}V_d,$$

where a, d, and t are defined as: $0.1 \leqq a \leqq 0.3$ and $0.62 \leqq a \leqq 1.3$, $0.2 \leqq d \leqq 1.8$, $0 \leqq t \leqq 1.55$, $0 \leqq t-a-d \leqq 1.2$ and $-0.1 \leqq a+d-t \leqq 0.96$. ]

[31. A hydride of the material of claim 30.]

[32. The material of claim 30 in the form of at leat one hydride electrode for an electrochemical energy storage system.]

[33. A material as defined in claim 1, wherein the composition formula is $$Ti_aZr_{y-a}Ni_cV_{3-y-c}M_x,$$

where M equals any of Al, Si, Cr, Mn, Fe, Co, Cu, Nb, Ag, Pd, and rare earth metals, and where a, c, x, and y are defined as: $0.1 \leqq a \leqq 1.3$, $0.2 \leqq c \leqq 1.95$, $0 \leqq x \leqq 0.2$, and $0.7 \leqq y \leqq 1.6$.]

[34. A hydride of the material of claim 33.]

[35. The material of claim 33 in the form of at least one hydride electrode for an electrochemical energy storage system.]

[36. A material as defined in claim 1, wherein the composition formula is selected from the group consisting of:

$$Ti_aZr_bNi_{2-b}V_{1-a},$$

where a, and b are defined as: $0.1 \leqq a \leqq 0.8$, $0.24 \leqq b \leqq 1.2$, $a+b \neq 1$;

$$Ti_aZr_bNi_{1-a}V_{2-b},$$

where a, and b are defined as: $0.2 \leqq a \leqq 0.75$, $0.24 \leqq b \leqq 1.2$, $a+b \neq 1$; and $$Ti_aZr_bNi_{i-b}V_{2-a},$$

where a, and b are defined as: $0.1 \leqq a \leqq 1.3$, $0.24 \leqq b \leqq 0.75$, $a+b \neq 1$.]

[37. A hydride of the material of claim 36.]

[38. The material of claim 36 in the form of at least one hydride electrode for an electrochemical energy storage system.]

[39. A material as defined in claim 1, wherein the composition formula is $$Ti_aCr_bZr_cNi_{1.95-t}V_{1.05+t-a-b-c},$$

where a, b, c and t are defined by: $0.1 \leqq a \leqq 1.2$, $0.1 \leqq b \leqq 1.2$, $0.1, \leqq c \leqq 1.2$, $0 \leqq t \leqq 1.75$, and for $b=0.5$, then $a+c=0.5$.]

[40. A hydride of the material of claim 39.]

[41. The material of claim 3 in the form of at least one hydride electrode for an electrochemical energy storage system.]

*42. A material for hydrogen storage and a hydride electrode selected from the group consisting of:*

$Ti_{0.3}Zr_{1.0}Ni_{1.4}Cr_{0.3}$;

$Ti_{0.5}Zr_{0.8}Ni_{1.2}Cr_{0.5}$;

$Ti_{0.5}Zr_{0.8}Ni_{1.2}Cr_{0.5}Mn_{0.1}$; *and hydrides thereof.*

*43. A material for hydrogen storage and a hydride electrode selected from the group consisting of:*

$Ti_{0.4}Cr_{0.4}Zr_{0.2}Ni_{0.6}V_{1.4}$;

$Ti_{0.3}Cr_{0.3}Zr_{0.5}Ni_{1.15}V_{0.45}$;

$Ti_{0.3}Cr_{0.3}Zr_{0.4}Ni_{0.6}V_{1.4}$;

$Ti_{0.3}Cr_{0.3}Zr_{0.5}Ni_{0.7}V_{1.2}Cu_{0.1}$; *and hydrides thereof.*

*44. A material for hydrogen storage and a hydride electrode, wherein said material having composition formula consisting of:*

$Ti_aZr_bNi_cCr_dM_x$; *and hydrides thereof, where M is selected from the group consisting of Al, Si, V, Mn, Fe, Co, Cu, Nb, Ag, Pd and rare earth metals, and where a, b, c, d, and x are defined by:* $0.25 \leqq a \leqq 1.0$, $0.2 \leqq b \leqq 1.0$, $0.8 \leqq c \leqq 1.6$, $0.3 \leqq d \leqq 1.0$, $a+b+c+d=3$, $0 \leqq x \leqq 0.2$, *wherein* $Ti+Zr$ *is* $\leqq 1.2$.

*45. The material of claim 44 in the form of at least one hydride electrode for an electrochemical energy storage system.*

*46. A material for hydrogen storage and a hydride electrode, wherein said material having composition formula consisting of:*

$Ti_aCr_bZr_cNi_dV_{3-a-b-c-d}M_x$; *and hydrides thereof, where M is selected from the group consisting of Al, Si, Mn, Co, Cu, Fe, Nb, Ag, Pd, and rare earth metals, and where a, b, c, d, and x are defined by:* $0.15 \leqq a \leqq 1.0$, $0.15 \leqq b \leqq 1.0$, $0.2 \leqq c \leqq 1.0$, $0.4 \leqq d \leqq 1.7$, $1.5 \leqq a+b+c+d \leqq 2.3$ *and* $0 \leqq x \leqq 0.2$, $Ti+Zr \leqq 0.8$, $V \leqq 1.4$ *and for* $x=0$, $b=0.5$ *then* $a+c \neq 0.5$.

*47. The material of claim 46 in the form of at least one hydride electrode for an electrochemical energy storage system.*

* * * * *